US007422795B2

(12) United States Patent
Sunkara et al.

(10) Patent No.: US 7,422,795 B2
(45) Date of Patent: *Sep. 9, 2008

(54) POLYTRIMETHYLENE ETHER ESTER ELASTOMER FLEXIBLE FILMS

(75) Inventors: Hari Babu Sunkara, Hockessin, DE (US); Marc B. Goldfinger, West Chester, PA (US); Bryan B. Sauer, Boothwyn, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/872,685

(22) Filed: Jun. 21, 2004

(65) Prior Publication Data

US 2005/0282966 A1 Dec. 22, 2005

(51) Int. Cl.
*B32B 27/36* (2006.01)
(52) U.S. Cl. ..................... 428/480; 528/300
(58) Field of Classification Search ............. 525/408; 428/480; 528/300
See application file for complete search history.

(56) References Cited

U.S. PATENT DOCUMENTS

| | | |
|---|---|---|
| 3,651,014 A | 3/1972 | Witsiepe |
| 4,076,532 A | 2/1978 | Gottermeier |
| 4,162,139 A | 7/1979 | Groves et al. |
| 4,413,964 A | 11/1983 | Winstead |
| 4,457,254 A | 7/1984 | Hungerford |
| 4,493,870 A | 1/1985 | Vrouenraets et al. |
| 4,561,920 A | 12/1985 | Foster |
| 4,739,012 A | 4/1988 | Hagman |
| 4,746,562 A | 5/1988 | Fant |
| 4,761,327 A | 8/1988 | Hamano et al. |
| 4,771,108 A | 9/1988 | Mackenzie |
| 4,859,514 A | 8/1989 | Friedrich et al. |
| 5,131,261 A | 7/1992 | Tou et al. |
| 6,169,131 B1 | 1/2001 | Goertz et al. |
| 6,187,696 B1 | 2/2001 | Lim et al. |
| 6,562,457 B1 | 5/2003 | Goldfinger et al. |
| 6,579,584 B1 | 6/2003 | Compton |
| 6,592,966 B1 | 7/2003 | Kobayashi et al. |
| 6,599,625 B2 | 7/2003 | Goldfinger et al. |
| 6,608,168 B1 | 8/2003 | Ng |
| 6,720,459 B2 | 4/2004 | Sunkara et al. |
| 2002/0007043 A1 | 1/2002 | Sunkara et al. |
| 2003/0120026 A1 | 6/2003 | Goldfinger et al. |
| 2004/0077823 A1* | 4/2004 | Sunkara ............ 528/272 |

FOREIGN PATENT DOCUMENTS

WO WO01/48062 7/2001

OTHER PUBLICATIONS

"Plastics in Packaging" Association Of Plastics Manufacturers in Europe, Copyright 2001, pp. 2-18, Brussels, Belgium.
Understanding Plastic Film: Its Uses, Benefits and Waste Management Options, American Plastics Council, Dec. 1996, pp. 1-4.
K-Resin Styrene-Butadiene Copolymers, 2001, pp. 1-14, Chevron Phillips Chemical Company.
Petrochem Next, "Biaxially Oriented Polypropylene (BOPP)".
PCT/US2005/021241 International Search Report Dated Sep. 13, 2005.

* cited by examiner

*Primary Examiner*—Jeffrey C Mullis

(57) ABSTRACT

Polytrimethylene ether ester elastomer flexible films are provided. The films have desirable physical properties, including tenacity, that enable their use in making robust packaging from relatively thin films.

13 Claims, No Drawings

POLYTRIMETHYLENE ETHER ESTER ELASTOMER FLEXIBLE FILMS

FIELD OF THE INVENTION

The present invention relates to flexible films comprising polytrimethylene ether ester elastomers, and articles of manufacture made from the films.

BACKGROUND

Thermoplastic elastomers (TPEs) are a class of polymers that combine the properties of two classes of polymers, namely thermoplastics, which can be reformed upon heating, and elastomers, which are rubber-like polymers. One form of TPE is a block copolymer, containing some blocks whose polymer properties usually resemble those of thermoplastics, and some blocks whose properties usually resemble those of elastomers. Those blocks whose properties resemble thermoplastics are often referred to as "hard" segments, while those blocks whose properties resemble elastomers are often referred to as "soft" segments. It is believed that the hard segments provide properties similar to those provided by chemical crosslinks in traditional thermosetting elastomers, while the soft segments provide rubber-like properties.

In addition to the nature of the hard and soft segments, the weight and mole ratios of hard to soft segments determine to a great extent the properties of a TPE. For example, longer soft segments usually lead to TPEs having lower initial tensile modulus, while a higher proportion of hard segments leads to polymers with higher initial tensile modulus. Other properties can be affected as well. Thus, manipulation on the molecular level affects changes in the properties of TPEs, and improved TPEs are desired.

Frequently the soft segments of TPEs are formed from poly(alkylene oxide) segments. Heretofore the principal poly (alkylene oxides) have been based on polymers derived from cyclic ethers such as ethylene oxide, 1,2-propylene oxide and tetrahydrofuran, which are readily available from commercial sources. When subjected to ring opening polymerization, the cyclic ethers form the polyether glycols polyethylene ether glycol (PEG), poly(1,2-propylene ether) glycol (PPG), and polytetramethylene ether glycol (PO4G, also referred to as PTMEG), respectively.

TPEs derived from polytrimethylene ether glycol soft segments (also referred to as PO3G) and trimethylene ester, for example, polytrimethylene ether trimethylene terephthalate (PO3G/3GT), have been developed and used to make fibers. U.S. Pat. No. 6,599,625 discloses that fibers made of PO3G/3GT had a higher unload power and a lower stress decay than did comparable fibers made of polytetramethylene ether glycol (PO4G) soft segments and 3GT hard segments. However, the percent set was slightly higher for the PO3G/3GT fibers than for the PO4G/3GT fibers. Tenacity and elongation at break were not significantly different between the two types of fibers.

TPEs comprising soft segments of polytrimethylene ether ester and hard segments of tetramethylene ester, for example, polytrimethylene ether tetramethylene terephthalate (PO3G/4GT) are disclosed, for example, in U.S. Pat. No. 6,562,457, which discloses fibers prepared from such TPEs, and methods for spinning the fibers. The PO3G/4GT fibers are disclosed to have a higher unload power, lower stress decay, higher elongation, and lower percent set than did comparable fibers made of PO4G/4GT. With the exception of tenacity, most of the properties, such as the stress decay, elongation, unload power and set were comparable to those of the PO3G/3GT fibers for which data were reported in the '625 patent mentioned hereinabove.

Although elastomeric fibers having desirable physical properties are now available, a need remains for other articles, such as films, having similarly advantageous properties. Such films can be useful in making bags and packaging, e.g., for food, storage and transportation.

SUMMARY OF THE INVENTION

One aspect of the present invention is a film comprising a polyether ester elastomer, comprising about 95 to about 5 weight % polytrimethylene ether ester soft segment and about 5 to about 95 weight % alkylene ester hard segment.

In preferred embodiments, the polyether ester elastomer comprises about 90 to about 60 weight % polytrimethylene ether ester soft segment and about 10 to about 40 weight % alkylene ester hard segment. In preferred embodiments, the alkylene ester hard segment comprises at least one of: ethylene ester, trimethylene ester, or tetramethylene ester. In highly preferred embodiments, the alkylene ester hard segment comprises trimethylene ester or tetramethylene ester.

In some preferred embodiments, the polyether ester elastomer contains at least about 70 weight %, more preferably at least about 74 weight %, polytrimethylene ether ester soft segment. The polyether ester elastomer preferably contains about 85 weight % or less, more preferably about 82 weight % or less, polytrimethylene ether ester soft segment. Also preferably, the polyether ester elastomer contains at least about 15 weight %, more preferably at least about 18 weight %, alkylene ester hard segment, and preferably about 30 weight % or less, more preferably about 26 weight % or less, alkylene ester hard segment.

The polyether ester elastomer preferably has an inherent viscosity of at least about 1.0 dL/g, more preferably at least about 1.4 dL/g, and even more preferably at least about 1.6 dL/g. Preferably the inherent viscosity is about 3.0 dL/g or less, more preferably about 2.4 dL/g or less, more preferably about 2.0 dL/g or less.

The polyether ester is preferably prepared by providing and reacting (a) polymeric ether glycol, (b) a short chain diol and (c) dicarboxylic acid or equivalent, such as, ester, acid halide or acid anhydride. In a preferred embodiment, at least 60 weight % of the polymeric ether glycol used to form the polytrimethylene ether ester soft segment is a polytrimethylene ether glycol. Preferably about 40 weight % or less of the polymeric ether glycol used to form the polytrimethylene ether ester soft segment is a polymeric ether glycol selected from polyethylene ether glycol, polypropylene ether glycol, polytetramethylene ether glycol, polyhexamethylene ether glycol, and copolymers of tetrahydrofuran and 3-alkyl tetrahydrofuran, and mixtures thereof.

In a preferred embodiment, at least 85 weight % of the polymeric ether glycol used to form the polytrimethylene ether ester soft segment is polytrimethylene ether glycol. Preferably, the polytrimethylene ether glycol has number average molecular weight of at least about 600, more preferably at least about 1,000, and even more preferably at least about 1,500. Preferably, the polytrimethylene ether glycol has number average molecular weight of about 5,000 or less, more preferably about 3,500 or less.

In a preferred embodiment, at least 75 mole % of the diol used to form the alkylene ester hard segment is 1,3-propanediol or 1,4-butanediol and up to 25 mole % of the diol are diols other than 1,4-butanediol and 1,3-propanediol, preferably with 2 to 15 carbon atoms, more preferably selected from ethylene, isobutylene, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether, and mixtures thereof. Preferred diols other than 1,4-butanediol and 1,3-propanediol contain 2 to 8 carbon atoms, more preferably 2 to 6.

Preferably, the dicarboxylic acid, ester, acid chloride or acid anhydride is an aromatic dicarboxylic acid or ester, more preferably selected from dimethyl terephthalate, bibenzoate, isophthlate, phthalate and naphthalate; terephthalic, bibenzoic, isophthalic, phthalic and naphthalic acid; and mixtures thereof. More preferred are the aromatic diesters.

In a preferred embodiment, at least 50 mole % (more preferably at least 70 mole % and even more preferably at least 85 mole %) of the dicarboxylic acid, ester, acid chloride or acid anhydride is selected from terephthalic acid and dimethyl terephthalate. In another preferred embodiment, the dicarboxylic acid, ester, acid chloride or acid anhydride are selected from terephthalic acid and dimethyl terephthalate. In another embodiment, the invention is directed to the polyether ester being prepared by providing and reacting polytrimethylene ether glycol and polytetramethylene ester or polytrimethylene ester.

Another aspect of the present invention is a polytrimethylene ether ester film comprising:
(a) about 5 to about 95 weight % polytrimethylene ether ester soft segment having the formula

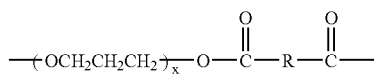

where x is about 9 to about 86, and
(b) about 95 to about 5 weight % alkylene ester hard segment having the formula

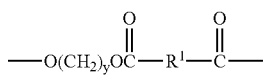

wherein y is 2 to 15 and $R^1$ and R, which may be the same or different, are divalent radicals remaining after removal of carboxyl functionalities from a dicarboxylic acid equivalent. In preferred embodiments, y is 2 to 8, more preferably 2 to 6.

In preferred embodiments, the film has an effective tenacity at break of about 0.1 grams per denier (gpd) to about 5 gpd, preferably at least about 1, more preferably at least about 2, and even more preferably at least about 3 gpd., and an elongation at break of about 20% to about 2000%. Units of stress at break or tenacity are given in grams per denier, gpd, where 1 gpd=89 MPa.

The thickness of the film can vary, depending upon the intended use for the film. For example, thicker films, e.g., having thicknesses of about 1 mm or thicker, may be preferred for some uses. In some embodiments, the film has a thickness of 500 micrometers or less. In some embodiments, the film has a thickness of 100 micrometers or less. In other embodiments, the film has a thickness of 50 micrometers or less. Generally, the film has a thickness of about 5 micrometers or more, in some embodiments about 10 micrometers or more, often about 20 micrometers or more. Thinner films, i.e., having thicknesses of 5-10 micrometers, may be preferred for use as moisture barriers. Thicker films, having thicknesses of about 1 mm or greater, can also be made.

In some embodiments, the film is a cast film. In some embodiments, the film is oriented. In preferred embodiments, the film is biaxially oriented.

Another aspect of the present invention is a film made from a blend comprising at least one first thermoplastic polymer, and a polyether ester elastomer comprising about 95 to about 5 weight % polytrimethylene ether ester soft segment and about 5 to about 95 weight % alkylene ester hard segment. In preferred embodiments, the polyether ester elastomer comprises about 90 to about 60 weight % polytrimethylene ether ester soft segment and about 10 to about 40 weight % alkylene ester hard segment. In preferred embodiments, the alkylene ester hard segment comprises at least one of: ethylene ester, trimethylene ester, or tetramethylene ester. In highly preferred embodiments, the alkylene ester hard segment comprises trimethylene ester or tetramethylene ester.

Another aspect of the present invention is a film made from a blend comprising at least one first polymer, and a second polymer comprising:
(a) about 5 to about 95 weight % polytrimethylene ether ester soft segment having the formula

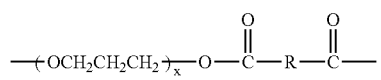

where x is about 9 to about 86, and
(b) about 95 to about 5 weight % alkylene ester hard segment having the formula

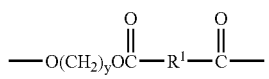

wherein y is 2-6 and $R^1$ and R, which may be the same or different, are divalent radicals remaining after removal of carboxyl functionalities from a dicarboxylic acid equivalent.

In preferred embodiments, the film has an effective tenacity at break of about 0.1 grams per denier (gpd) to about 5 gpd, and an elongation at break of about 20% to about 2000%. Units of stress at break or tenacity are given in grams per denier, gpd, where 1 gpd=89 MPa.

In some embodiments the films comprise at least one ingredient derived from a renewable source.

DETAILED DESCRIPTION

The present invention provides elastomeric flexible films having desirable mechanical properties, particularly tensile strength, elongation, toughness, unload power, stress decay and percent set, and are particularly useful in fabricating robust bags offering ease of handling. Although elastomeric fibers having such properties have been known, it has been surprisingly found that physical properties of films made from the same compositions used in known elastomeric fibers have different properties, particularly as compared among polymer compositions, from the fibers.

The films disclosed herein have desirable physical properties for use in fabricating robust packaging materials using thinner films than conventionally used for similar packaging, using relatively small amounts of elastomer, thereby enabling the reduction of material cost and overall manufacturing cost.

All patents, patent applications, and publications referred to herein are incorporated herein by reference in their entirety.

Unless stated otherwise, all percentages, parts, ratios, etc., are by weight. Further, when an amount, concentration, or other value or parameter is given as either a range, preferred range or a list of upper preferable values and lower preferable values, the recited amount, concentration, or other value or parameter is intended to include all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The present invention provides flexible films comprising polytrimethylene ether ester elastomers having desirable mechanical properties such as tenacity, elasticity, toughness and flexibility, optionally without the use of plasticizers. In addition the stretch recovery properties of the films are such that following stretching, the films return to dimensions closer to their original to its original dimension than films made with other materials. Films without any plasticizers are desirable for use in many food package applications.

The films can be prepared from the polymers using methods known to those skilled in the art. The flexible films can be cast films or oriented films Oriented films can be uniaxially oriented or biaxially oriented. Orientation can be effected by any process known in the art, such as, for example a tubular or flat film process. Orientation of films is disclosed, for example, in patent publication WO 01/48062, the disclosures of which are hereby incorporated herein by reference.

The present invention provides, in one aspect, a film comprising a polyether ester elastomer, comprising about 95 to about 5 weight % polytrimethylene ether ester soft segment and about 5 to about 95 weight % alkylene ester hard segment.

In preferred embodiments, the polyether ester elastomer comprises about 90 to about 60 weight % polytrimethylene ether ester soft segment and about 10 to about 40 weight % alkylene ester hard segment. In preferred embodiments, the alkylene ester hard segment comprises at least one of: ethylene ester, trimethylene ester, or tetramethylene ester. In highly preferred embodiments, the alkylene ester hard segment comprises trimethylene ester or tetramethylene ester.

In another aspect, the invention provides a polytrimethylene ester film comprising a polytrimethylene ether ester elastomer comprising:

(a) about 5 to about 95 weight % polytrimethylene ether ester soft segment having the formula

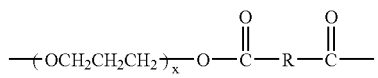

where x is about 9 to about 86, and (b) about 95 to about 5 weight % alkylene ester hard segment having the formula

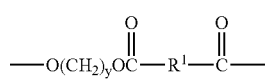

wherein y is 2-6 and $R^1$ and R, which may be the same or different, are divalent radicals remaining after removal of carboxyl functionalities from a dicarboxylic acid equivalent. In preferred embodiments, y is 3 or 4.

The specified amounts of soft segment and hard segment recited herein are based on the total combined amounts of soft segment and hard segment in the polymer. In some preferred embodiments, the polymer comprises about 30% to about 90% soft segment. In some embodiments, the polytrimethylene ether ester elastomer comprises from about 60 to about 90 weight % soft segment and from about 40 to about 10 weight % alkylene ester hard segment. In some embodiments, the polytrimethylene ether ester elastomer comprises at least about 70 weight %, more preferably at least about 74 weight %, soft segment, and in such embodiments, the polytrimethylene ether ester elastomer comprises up to about 82, preferably up to about 85 weight % polytrimethylene ether soft segment. In some preferred embodiments, the polytrimethylene ether ester elastomer comprises at least about 15, more preferably at least about 18 weight %, up to about 30 weight %, more preferably up to about 26 weight %, alkylene ester hard segment. In some preferred embodiments, the polymer comprises about 50% to about 80% soft segment, and about 20% to about 50% hard segment.

It is intended that any reference to, for example, a polytrimethylene ether glycol, dicarboxylic acid equivalent, etc., encompass one or more of the recited components. Thus, for example, reference to the polymeric ether glycol used to form the soft segment being polytrimethylene ether glycol, means that one or more polytrimethylene ether glycols, of which one or more can be different from the other(s), can be used.

In preferred embodiments, the film has an effective tenacity at break of about 0.1 grams per denier ($gpd_{eff}$) to about 5. In some preferred embodiments, the effective tenacity at break is about 3 to 4. In preferred embodiments, the film has an elongation at break of about 20% to about 2000%, preferably from about 100% to about 1200%, more preferably from about 600% to about 1000%, although desirable films can have elongations at break at any value within the cited ranges. Units of tenacity used herein are grams per denier, gpd, where 1 gpd=89 MPa.

The polytrimethylene ether ester film preferably has an inherent viscosity of at least about 1.0 dL/g, more preferably at least about 1.4 dL/g, even more preferably at least about 1.6 dL/g, as measured in a 0.5% solution of m-cresol at 30° C. Also preferably, the inherent viscosity of the polytrimethylene ether ester is about 3.0 dL/g or less, more preferably about 2.4 dL/g or less, more preferably about 2.0 dL/g or less.

Herein, the terms "polytrimethylene ether ester soft segment" and "soft segment" are used to refer to the reaction product of polymeric ether glycol and dicarboxylic acid or equivalent, which reaction forms an ester connection, wherein at least 40 weight % of the polymeric ether glycol used to form the soft segment is polytrimethylene ether glycol (PO3G). Preferably, at least about 50 weight % of the polymeric ether glycol is polytrimethylene ether glycol, more preferably at least about 60 weight %. The content of polytrimethylene ether glycol can be as high as 90, 95 or 100 weight %. The term "polytrimethylene ether ester elastomer", as used herein, is intended to encompass polymers comprising soft segments containing trimethylene ether repeat units and hard segments containing alkylene ester repeat units.

PO3G can be prepared by any process known to those skilled in the art. For example, PO3G can be prepared by dehydration of 1,3-propanediol or by ring opening polymerization of oxetane. Methods for making PO3G are described in U.S. Pat. No. 6,720,459 and U.S. Patent Application Publication No. 2002/0007043, the disclosures of which are incorporated herein by reference in their entirety. The polytrimethylene ether glycols prepared using the disclosed processes has few unsaturated end groups. The soft segment can comprise up to about 60 weight percent of another polymeric ether glycol, i.e., a polymeric ether glycol other than PO3G. Preferred are polyethylene ether glycol (PEG), polypropylene ether glycol (PPG), polytetramethylene ether glycol (PO4G), polyhexamethylene ether glycol, and copolymers of tetrahydrofuran and 3-methyl tetrahydrofuran (THF/3MeTHF). Thus, for example, the other polymeric ether glycol can be PEG, a mixture of PEG and PPG, a mixture of PEG and PO4G, a mixture of PEG and THF/3MeTHF or any 3 or 4 component combination thereof. The other polymeric ether glycols, if present, preferably have a number average molecular weight of at least about 600, more preferably at least about 1,000, even more preferably at least about 1,500. Also preferably, the molecular weight of the other polymeric ether glycol, if present, is about 5,000 or less, more preferably about 3,500 or less.

By "dicarboxylic acid equivalent" is meant dicarboxylic acids and compounds that perform substantially like dicarboxylic acids in reaction with glycols, in that, following reaction with glycols, dicarboxylic acids and their equivalents produce the same segment in the polyester thus formed. Dicarboxylic acid equivalents include dicarboxylic acids, diesters of dicarboxylic acids, and diester-forming derivatives such as acid halides (e.g., acid chlorides) and anhydrides. The dicarboxylic acid equivalent can contain any substituent groups or combinations thereof.

The dicarboxylic acid equivalents can be aromatic, aliphatic or cycloaliphatic. "Aromatic dicarboxylic acid equivalents" are dicarboxylic acid equivalents in which each carboxyl group is attached to a carbon atom in an aromatic ring or aromatic ring system. "Aliphatic dicarboxylic acid equivalents" are dicarboxylic acid equivalents in which each carboxyl group is attached to a fully saturated carbon atom or to a carbon atom that is part of an olefinic double bond. If the fully saturated carbon atom is in a ring, the equivalent is a "cycloaliphatic dicarboxylic acid equivalent." Preferred dicarboxylic acid equivalents are dicarboxylic acids, and diesters of dicarboxylic acids, especially dimethyl esters of dicarboxylic acids. Also preferred are aromatic dicarboxylic acids or diesters alone or in combination with small amounts, for example, less than about 20 mole percent of one or more aliphatic or cycloaliphatic dicarboxylic acids or diesters. Most preferred are dicarboxylic acids and dimethyl esters of aromatic dicarboxylic acids.

Exemplary aromatic dicarboxylic acids useful in making the polytrimethylene ether esters include terephthalic acid, isophthalic acid, bibenzoic acid, naphthalic acid, substituted dicarboxylic compounds with benzene nuclei such as bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, and $C_1$-$C_{10}$alkyl and ring substitution derivatives thereof, such as halo, alkoxy or aryl derivatives. Hydroxy acids such as p-(hydroxyethoxy) benzoic acid can also be used, provided an aromatic dicarboxylic acid is also present. Exemplary aliphatic and cycloaliphatic dicarboxylic acids useful in making the polytrimethylene ether esters include sebacic acid, 1,3-or 1,4-cyclohexane dicarboxylic acid, adipic acid, dodecanedioic acid, glutaric acid, succinic acid, oxalic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethyl succinic acid, cyclopentanenedicarboxylic acid, decahydro-1,5-(or 2,6-)naphthalene dicarboxylic acid, 4,4'-bicyclohexyl dicarboxylic acid, 4,4'methylenebis (cyclohexylcarboxylic acid), 3,4-furan dicarboxylate, and 1,1-cyclobutane dicarboxylate. Dicarboxylic acid equivalents in the form of diesters, acid halides and anhydrides of the aforementioned aliphatic dicarboxylic acids are also useful. Exemplary aromatic diesters include dimethyl terephthalate, bibenzoate, isophthlate, phthalate and naphthalate.

Preferred are terephthalic, bibenzoic, isophthalic and naphthalic acid; dimethyl terephthalate, bibenzoate, isophthlate, naphthalate and phthalate; and mixtures thereof. Particularly preferred dicarboxylic acid equivalents are equivalents of phenylene dicarboxylic acids, more particularly terephthalic and isophthalic acid and diesters thereof, dimethyl terephthalate and dimethyl isophthalate. In some embodiments, two or more dicarboxylic acids equivalents can be used. For example, terephthalic acid or dimethyl terephthalate can be used with small amounts of one or more other dicarboxylic acid equivalents.

In some preferred embodiments, at least 50 mole % of the dicarboxylic acid equivalent comprises terephthalic acid and/or dimethyl terephthalate, more preferably at least 70 mole %, even more preferably at least 85 mole % and most preferably about 95-100 mole %.

"Alkylene ester hard segment", as used herein, means the reaction product of a short chain diol(s) and dicarboxylic acid equivalent, which reaction forms an ester connection. For example, the short chain diol can be an aliphatic $C_2$-$C_{15}$ diol, preferably $C_2$-$C_8$, more preferably $C_2$-$C_6$. Examples of suitable diiols include: ethylene glycol, isobutylene glycol, trimethylene glycol, tetramethylene glyol, pentamethylene glycol, 2,2-dimethyltrimethylene glycol, 2-methyltrimethylene glycol, hexamethylene glycol, decamethylene glycol, dihydroxy cyclohexane, cyclohexane dimethanol, and hydroquinone bis(2-hydroxyethyl) ether. More preferably, the diol is ethylene glycol, trimethylene glycol, tetramethylene glycol, or mixtures thereof.

Components of the soft segment and/or the hard segment of the elastomer can be bioderived. For example, 1,3-propanediol, obtained from a fermentation process using a renewable source such as corn starch, can be used to make PO3G soft segment and 3GT hard segment.

The polytrimethylene ether ester can be made using a conventional ester exchange reaction, i.e., esterification or transesterification depending on the nature of the dicarboxylic acid equivalent. For example, dimethyl terephthalate can be heated with polytrimethylene ether glycol and an excess of 1,4-butanediol in the presence of a catalyst at 150 to 250° C., while distilling off the methanol formed by the ester exchange. The reaction is typically performed at a pressure of about 1 atmosphere. The reaction product is a mixture of the ester exchange reaction products of the dimethyl terephthalate and the polytrimethylene ether glycol and 1,4-butanediol, primarily bis(hydroxybutyl) terephthalate with varying amounts of (hydroxy-polytrimethylene ether) terephthalates with a small amount of the corresponding oligomers. The mixture then undergoes polymerization , for example polycondensation, to form a copolymer with a polytrimethylene ether soft segment and a tetramethylene terephthalate hard segment (which is a condensation product of 1,4-butanediol and dimethyl terephthalate). The polymerization can be followed by additional ester exchange and distillation to remove the short chain diol and thus increase molecular weight. Polycondensation is typically performed under vacuum. Pressure is typically in the range of 0.01 to 18 mm Hg (1.3 to 2400 Pa), preferably in the range of 0.05 to 4 mm Hg (6.7 to 553 Pa) and most preferably 0.05 to 2 mm Hg. Polycondensation is typically run at a temperature in the range of about 220° C. to 260° C.

To avoid excessive residence time at high temperatures and possible accompanying thermal degradation, a catalyst can be employed in the ester exchange. Catalysts useful in the ester exchange process include organic and inorganic compounds of titanium, lanthanum, tin, antimony, zirconium, and zinc. Titanium catalysts, such as tetraisopropyl titanate and tetrabutyl titanate, are preferred and are preferably used in an amount of at least about 25 ppm (preferably at least about 50 ppm and more preferably at least about 70 ppm) and up to about 1,000 ppm (preferably up to about 700 ppm and more preferably up to about 400 ppm) titanium by weight, based on the calculated weight of the finished polymer. Tetraisopropyl titanate and tetrabutyl titanate are also effective as polycondensation catalysts. Additional catalyst can be added after ester exchange or direct esterification reaction and prior to polymerization. Preferably the catalyst is tetrabutyl titanate (TBT).

Ester exchange polymerizations are generally conducted in the melt without added solvent, but inert solvents can be added to facilitate removal of volatile components, such as water and diols, at low temperatures. This technique is useful during reaction of the polytrimethylene ether glycol or the diol with the dicarboxylic acid equivalent, especially when it involves direct esterification, i. e., the dicarboxylic acid equivalent is a diacid. Other special polymerization techniques can be useful for preparation of specific polymers. Polymerization (polycondensation) can also be accomplished in the solid phase by heating divided solid product from the reaction of polytrimethylene ether glycol, a dicarboxylic acid equivalent, and a short chain diol in a vacuum and/or in a stream of inert gas to remove liberated diol. This type of polycondensation is referred to herein as "solid phase polymerization" (or abbreviated "SPP"). It has been surprisingly discovered that the PO3G/3GT polymers are more susceptible to solid phase polymerization than PO3G/4GT or PO4G/4GT polymers. "More susceptible" means that the PO3G/3GT polymers exhibit faster kinetics when subjected to solid phase polymerization than do PO3G/4GT or PO4G/4GT polymers. SPP is a preferred method to increase the molecular weight of PO3G/3GT elastomers to a desired levels.

Alternative ester exchanges to those described above can be used. For example, polytrimethylene ether glycol can be reacted directly with a polyester (e.g., polytetramethylene terephthalate) in the presence of catalyst until randomization occurs. Suitable catalysts include catalysts recited hereinabove, and preferred are titanium catalysts such as tetrabutyl titanate.

Batch or continuous methods can be used for the processes described above or for any stage of polytrimethylene ether ester preparation. Continuous polymerization, by ester exchange, is preferred.

In preparing the polytrimethylene ether ester elastomers, it is sometimes desirable to incorporate known branching agents to increase melt strength. A branching agent is typically used in a concentration of 0.00015 to 0.005 equivalents per 100 grams of polymer. The branching agent can be, for example, a polyol having 3 or more hydroxyl groups, preferably 3-6 hydroxyl groups, a polycarboxylic acid having 3 or more carboxyl groups, preferably 3 or 4 carboxyl groups, or a hydroxy acid having a total of 3 or more hydroxyl and carboxyl groups, preferably 3-6 hydroxyl and carboxyl groups. Exemplary polyol branching agents include glycerol, sorbitol, pentaerytritol, 1,1,4,4-tetrakis(hydroxymethyl)cyclohexane, trimethylol propane, and 1,2,6-hexane triol. Exemplary polycarboxylic acid branching agents include hemimellitic, trimellitic, trimesic pyromellitic, 1,1,2,2-ethanetetracarboxylic, 1,1,2-ethanetricarboxylic, 1,3,5-pentanetricarboxylic, 1,2,3,4-cyclopentanetetracarboxylic and like acids. Although the acids can be used as is, it is preferred to use them in the form of their lower alkyl esters.

Properties of the polytrimethylene ether ester can be affected by varying the composition, including varying, for example, the nature of the dicarboxylic acid equivalent, the type of short chain diol, molecular weight of polytrimethylene ether glycol, the weight percent of hard segment, and/or the mole ratio of hard segment to soft segment.

The polytrimethylene ether esters can be blended with one or more other polymers and used to make a film. Such other polymers are preferably thermoplastics. Examples are polyester, nylon, polyethylene, polypropylene, polyurethane, polyurethane urea, acrylic polymers, and polyolefins including olefinic copolymers.

Conventional additives can be incorporated into the polytrimethylene ether ester or film by known techniques. Exemplary additives include delusterants (e.g., TiO2, zinc sulfide or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brightners, extenders, processing aids, viscosity boosters, and other functional additives.

It is generally preferred that the polytrimethylene ether esters have a weight average molecular weight of at least about 35,000, more preferably at least about 45,000, even more preferably at least about 50,000, still even more preferably at least about 60,000, and still more preferably at least about 80,000. Generally, the weight average molecular weight is about 168,000 or less, preferably about 150,000 or less, more preferably about 120,000 or less. In some highly preferred embodiments, the polytrimethylene ether esters have a weight average molecular weight from about 60,000 to about 110,000. The practical upper limit of the weight average molecular weight is determined by factors such as processability, particularly extrudability, in that for some processes, too high a molecular weight results in too high a viscosity for the desired processing.

Films comprising the polytrimethylene ether ester elastomers can be laminated or coated onto substrates, using known methods. Examples of substrates that can be laminated include, for example, paper, paperboard, inorganic foams, organic foams, and inorganic-organic foams, polymeric films and sheets, metal substrates, and woven and nonwoven fabrics. The films can also be used in food packaging, such as in food wraps. Substrates laminated or coated with the films can be used in making food containers. One of ordinary skill in the art will be able to identify appropriate process parameters based on the polymeric composition and process used for the coating formation, and the desired application.

EXAMPLES

Polytrimethylene ether ester elastomers were prepared as described in U.S. Pat. Nos. 6,562,457 and 6,599,625, the disclosures of which are incorporated herein by reference. Films were pressed above the melting point of the elastomers. Films were typically prepared slightly above 200 ° C. by pressing between solid plates using Teflon® release films. Pressures used were between 20 psi and 200 psi, and were applied for about one minute. Films were unoriented and were cut into narrow strips about 3 inches long, and ¼ inch wide for mechanical testing. Measurements taken from three to five samples were averaged to obtain mechanical properties as described in U.S. Pat. Nos. 6,562,457 and 6,599,625.

Examples 1-2

Tenacity at break, T, in grams per denier (gpd) and percent elongation at break, E, were measured on an Instron® Tester equipped with a Series 2712 (002) Pneumatic Action Grips equipped with acrylic contact faces. The test was repeated three times and the average of the results is reported. The use of these particular grips is preferred because it helps to avoid slippage of the samples being tested. Moreover, test results obtained using other types of grips can result in the reporting of artificially high elongations due to slippage. Thus, it should be noted that testing of the present films using such other types of grips may result in higher values for tenacity and elongation than those reported herein. Accordingly, for an accurate comparison between materials, consideration of the type of grips used, and particularly whether or not the grips have acrylic contact faces, is highly desirable.

Hard Segment Weight Percentage Calculation

The weight percent hard segment was calculated according to the following formula:

$$\frac{100(M_{hs})[(w_1/M_1)-(w_2/M_2)]}{(M_{hs})[(w_1/M_1)-(w_2/M_2)]+(M_{ss})(w_2/M_2)}$$

where:
$w_1$ is weight of the dicarboxylic acid equivalent
$w_2$ is weight of the glycol
$M_1$ is molecular weight of the dicarboxylic acid equivalent in amu
$M_2$ is molecular weight of the glycol in atomic mass units ("amu") (grams/mole)
$M_{hs}$ is molecular weight of the hard segment repeat unit in amu (grams/mole)
$M_{ss}$ is molecular weight of the soft segment in amu (grams/mole)

Number Average Molecular Weight (Mn)

The number average molecular weights (Mn) of polytrimethylene ether glycols were determined either by analyzing hydroxyl end-groups using NMR spectroscopic method or by titration. Hydroxyl number was determined according to ASTM E222 method and is the way that should be used to analyze whether something is within the scope of this invention.

Inherent Viscosity

Inherent Viscosity (IV) measurements were made following ASTM Method 2857-70. The polymer samples were dried at 70° C. for 3 hours before weighing. Samples were run at 30° C. using a 0.5% solution in m-cresol. To improve efficiency, accuracy, and precision an AutoVisc® Automatic Measuring System (Design Scientific, Gainesville, Ga., U.S.A., now believed to be manufactured by Cannon Instruments, State College, Pa., U.S.A. under the name AutoVisc® I) automated viscosity measuring system was used. A high density infrared fiber optic detection system was used in place of a human operator and an air bath was used in place of the oil or water bath normally used to provide constant temperature. The AutoVisc exceeds the accuracy specifications of ASTM D-445, "Standard Test Method For Kinematic Viscosity of Transparent and Opaque Liquids".

The polymers tested had the compositions shown in Table 1. The mechanical properties of the films made from the polymers are shown in Table 2.

TABLE 1

| Ex. | Wt % HS | HS (%) | SS | SS MW | 3-Me THF (%) | HS/SS |
|---|---|---|---|---|---|---|
| 1 | 23 | 4GT | PO3G | 2350 | 0 | 3.36 |
| 2 | 23 | 3GT | PO3G | 2350 | 0 | 3.36 |
| Comparative A | 22.6 | 4GT | PO4G | 2000 | 0 | 2.88 |
| Comparative B | 23 | 3GT | PO4G | 2000 | 0 | 3.15 |
| Comparative C | 24 | 4GT | PO4G/ 3Me THF | 2117 | 8 | 3.22 |
| Comparative D | 22.8 | 3GT | PO4G/ 3Me THF | 2117 | 8 | 3.22 |

TABLE 2

| Example | Engineering Tenacity (gpd) | Tenacity at break gpd$_{eff}$ | Elongation (%) | Load power[1] gpd$_{eff}$ * 1000 | Unload power[2] gpd$_{eff}$ * 1000 | Set[3] (%) | Stress Decay (%) |
|---|---|---|---|---|---|---|---|
| 1 | 0.277 | 3.24 | 1069 | 602 | 105 | 156 | 7 |
| 2 | 0.171 | 1.79 | 945 | 504 | 95 | 154 | 7 |
| Comparative A | 0.178 | 1.45 | 713 | 791 | 25 | 302 | 22 |
| Comparative B | 0.191 | 1.64 | 757 | 721 | 45 | 153 | 22 |
| Comparative C | 0.171 | 1.53 | 793 | 623 | 60 | 167 | 17 |
| Comparative D | 0.178 | 1.53 | 760 | 686 | 80 | 136 | 17 |

[1]Load power measured in units of grams per effective denier × 1000 at a strain of 600% after cycling 5 × to 600% strain.
[2]Unload power measured in units of grams per effective denier × 1000 at a strain of 400% after cycling 5 × to 600%.
[3]Percent set also measured after 5 cycles to 600%. Tenacity is expressed in gpd (gram per denier) where 1 gpd = 89 MPa. Denier is the weight-per-unit-length of the fibers.

Table 2 shows that a PO3G soft segment generally increases the unload power. A PO3G soft segment also contributes to higher elongation and effective tenacity. In Example 1, the tenacity is almost double that for the comparative examples. The two-fold increase in tenacity for 4GT/PO3G film as compared to 4GT/PO4G film is unexpected from known properties of fibers of the same composition. As shown in Table 2, the properties of elastomers containing PO3G soft segments are superior to those of the listed polymers having other soft segments. Table 2 also shows that polymers with PO4G soft segments exhibit lower unload power and higher stress decay in comparison to the polymers with PO3G soft segments.

Instead of the engineering tenacity commonly determined by the stress at break normalized to the initial denier, the effective tenacity can be calculated by multiplying the engineering tenacity by the stretch ratio at break (i.e., for 500% elongation the stretch ratio, SR, is 6×). This accounts for the cross sectional area at break which can vary substantially for elastomers with different elongation. These quantities are presented as $gpd_{eff}$ in Table 2, which shows that the effective tenacity is about a factor of 2 higher for PO3G/4GT than the other polymers listed.

Examples 3-6

Elastomers having different hard segments and soft segments reported in Table 3 were prepared by a batch polymerization process. A typical batch polymerization procedure is given below:

PO3G/3GT elastomer synthesis. A 3 necked (straight neck) 250 mL glass round bottom flask was charged with 72.0 g (34.2 mmol) of PO3G polyether glycol having a number average molecular weight of 2,100, 28.9 g (380 mmol) of 1,3-propanediol, 33.0 g (170 mmol) dimethyl terepthalate, 0.50 g Ethanox® 330 antioxidant. Under a positive $N_2$ gas flow, 1.0 mL of a catalyst solution was added. The catalyst was Tyzor® TBT tetrabutyl titanate and was used as a 5% solution in 1,3-propanediol. The flask was fitted with a take off arm, stirrer and nitrogen inlet connecting a thermocouple and mTorr vacuum gage sensor. The reaction was heated by placement in a heating mantle. The polymerization was allowed to proceed for 2.0 hours at 240° C. under $N_2$. At that point, vacuum was introduced and the pressure was lowered from atmospheric to 1 mmHg (133.3 Pa) over 30 min. The reaction was continued under vacuum at 240° C. until sufficient viscosity was achieved. The reaction was allowed to cool under $N_2$ and the flask quenched in liquid $N_2$. The resulting batch polymer product was ground, dried and subjected to solid-state polymerization in a vacuum oven with positive $N_2$ flow at 150° C. for 20 hours. The inherent viscosity of the batch polymers and solid state polymerized polymers is reported in Table 3.

TABLE 3

| Ex | HS/SS | Initial IV dL/g | IV after SSP dL/g | Change in IV |
|---|---|---|---|---|
| 3 | 2GT/PO3G | 1.08 | 1.24 | 0.16 |
| 4 | 3GT/PO3G | 1.06 | 1.55 | 0.49 |
| 5 | 3GT/PO4G | 1.77 | 2.28 | 0.51 |
| 6 | 4GT/PO3G | 1.60 | 1.65 | 0.05 |

The data in Table 3 surprisingly reveals that the polymers having a 3GT hard segment, irrespective of the soft segment, are readily polymerized by solid state polymerization than polymers having 2GT and 4GT hard segments. An unexpected, dramatic increase in the inherent viscosity when the polymer has a 3GT hard segment was also observed.

Example 7-11

PO3G/3GT elastomers for Examples 7-9 were prepared with a 72 weight % soft segment and 28 weight % hard segment contents in a batch polymerization method as described above. Polymers for Examples 10 and 11 were prepared by solid state polymerizing the polymer of Example 8. Solid state polymerization was conducted at 150° C. under reduced-pressure inert atmosphere at varied times. The effect of weight average molecular weight ($M_w$) on film properties is shown in Table 4 for PO3G/3GT elastomers in comparison with a commercial HYTREL polymer containing PO4G soft segment (78%) and 4GT hard segment (22%).

TABLE 4

Film Properties of PO3G/3GT Polymer as a Function of Molecular Weight

| Ex. | IV dL/g | $M_w$ | Engineering Tenacity (gpd) | Tenacity at break $gpd_{eff}$ | Elong (%) | Load power[1] $gpd_{eff}$ * 1000 | Unload power[2] $gpd_{eff}$ * 1000 | Set (%) | Stress Decay (%) |
|---|---|---|---|---|---|---|---|---|---|
| 7 | 0.935 | 35900 | 0.110 | 1.02 | 825 | 268 | 3.2 | 78 | 11.7 |
| 8 | 1.142 | 44600 | 0.150 | 1.48 | 890 | 296 | 6.2 | 75 | 11.4 |
| 9 | 1.339 | 53000 | 0.217 | 2.36 | 990 | 292 | 9.6 | 65 | 11.2 |
| 10 | 1.959 | 103100 | 0.291 | 2.91 | 900 | 328 | 15.2 | 59 | 10.9 |
| 11 | 2.737 | 168800 | 0.310 | 2.85 | 820 | 308 | 14.4 | 55 | 11.4 |
| Hytrel 3078 | 1.632 | 77200 | 0.276 | 2.67 | 870 | 252 | 4.2 | 76 | 17.7 |

[1] Load power measured in units of grams per effective denier × 1000 at a strain of 300% after cycling 5 × to 300%.
[2] Unload power measured in units of grams per effective denier × 1000 at a strain of 100% after cycling 5 × to 300%.
[3] Percent set also measured after 5 cycles to 300%.

The data in Table 4 show that the molecular weight of the PO3G/3GT used in making the films has a surprising effect on certain properties such as tenacity, unload power, and percent set but has little effect on elongation, load power and stress decay. Furthermore, the stretch recovery properties of films made from PO3G/3GT elastomer having weight average molecular weights of about 100,000 are outstanding when compared to HYTREL® polyester, particularly in terms of tenacity, unload power, stress decay and percent set. The data presented herein is surprising in view of previously published properties of PO3G/3GT.

What is claimed is:

1. A laminate comprising an elastomeric film comprising a polytrimethylene ether ester elastomer consisting essentially of: about 95 to about 5 weight % polytrimethylene ether ester soft segment and about 5 to about 95 weight % of a hard segment consisting essentially of tetramethylene ester, said film having an effective tenacity of at least about 2 gpd.

2. The laminate of claim 1 wherein the polyether ester elastomer consists essentially of about 90 to about 60 weight % polytrimethylene ether ester soft segment and about 10 to about 40 weight % tetramethylene ester hard segment.

3. The laminate of claim 1 wherein the polytrimethylene ether ester elastomer consists of: about 5 to about 95 weight % polyalkylene ether ester soft segment having the formula

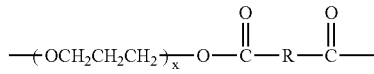

where x is about 9 to about 86, and about 95 to about 5 weight % alkylene ester hard segment having the formula:

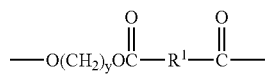

wherein y is 4 and $R^1$ and R, which may be the same or different, are divalent radicals remaining after removal of carboxyl functionalities from a dicarboxylic acid equivalent.

4. The laminate of claim 1 wherein said elastomeric film has an elongation at break of at least about 800%.

5. The laminate of claim 1 wherein said elastomeric film has a thickness of about 100 micrometers or less.

6. The laminate of claim 1 wherein said elastomer has a weight average molecular weight of about 60,000 or greater.

7. The laminate of claim 1, wherein said elastomer has a weight average molecular weight of about 168,000 or less.

8. A food package comprising a laminate of claim 1.

9. The laminate of claim 1, wherein said elastomer has a weight average molecular weight from about 60,000 to about 110,000.

10. The laminate of claim 1 wherein the amount of soft segment is at least about 30 weight %, based on the total weight of the elastomer.

11. The laminate of claim 1 wherein the amount of soft segment is at least about 60 weight %, based on the total weight of the elastomer.

12. The film of claim 1 laminate of claim 1 wherein the amount of hard segment is at least about 15 weight %.

13. The laminate of claim 1, comprising at least one other polymer, wherein said other polymer is a thermoplastic polymer.

* * * * *